Oct. 27, 1953     F. D. GRAY ET AL     2,656,921
DEVICE FOR SEPARATING POTATOES FROM STONES
Filed Sept. 23, 1950     2 Sheets-Sheet 1
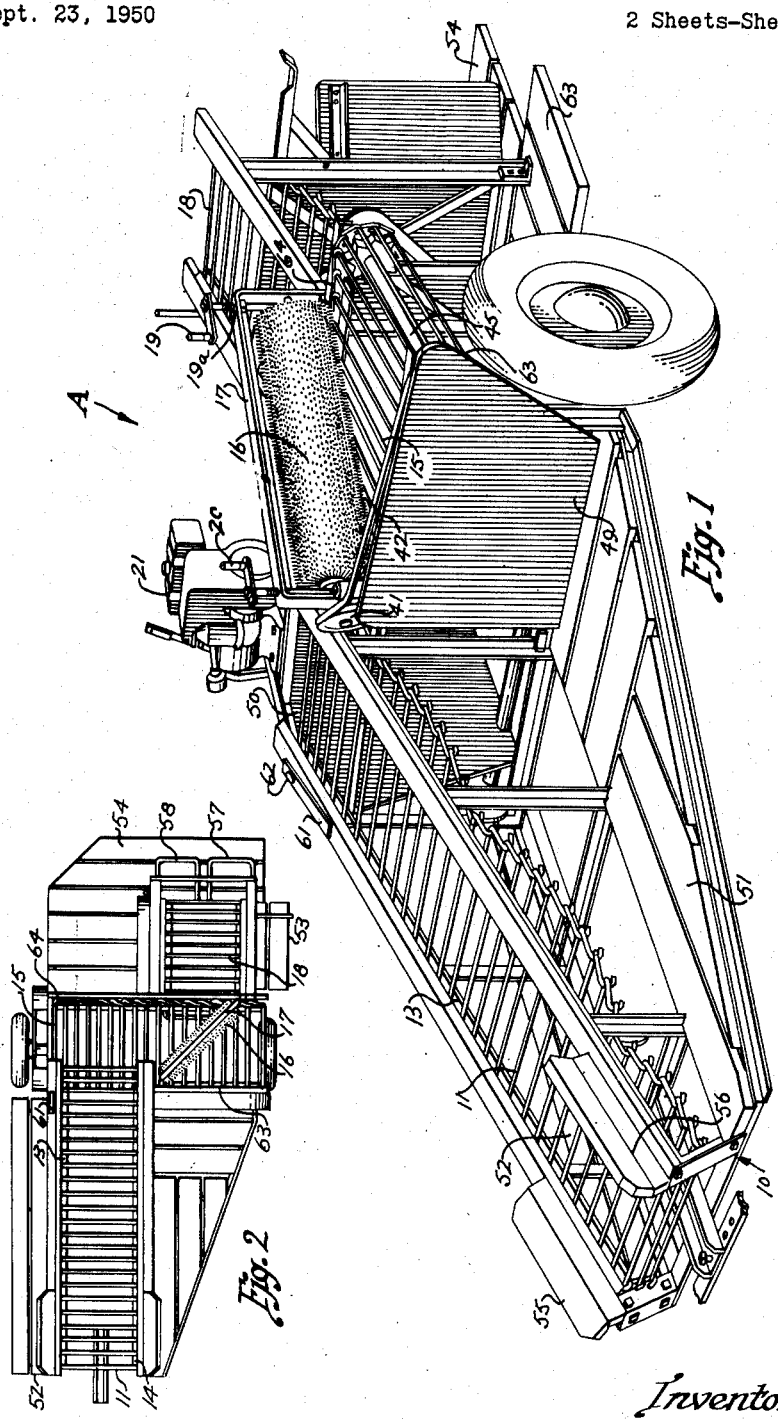
Inventors
FRANKLIN D. GRAY
EDWARD G. SNYDER
By: Fetherstonhaugh & Co.
Att'ys.

Oct. 27, 1953  F. D. GRAY ET AL  2,656,921
DEVICE FOR SEPARATING POTATOES FROM STONES
Filed Sept. 23, 1950  2 Sheets-Sheet 2
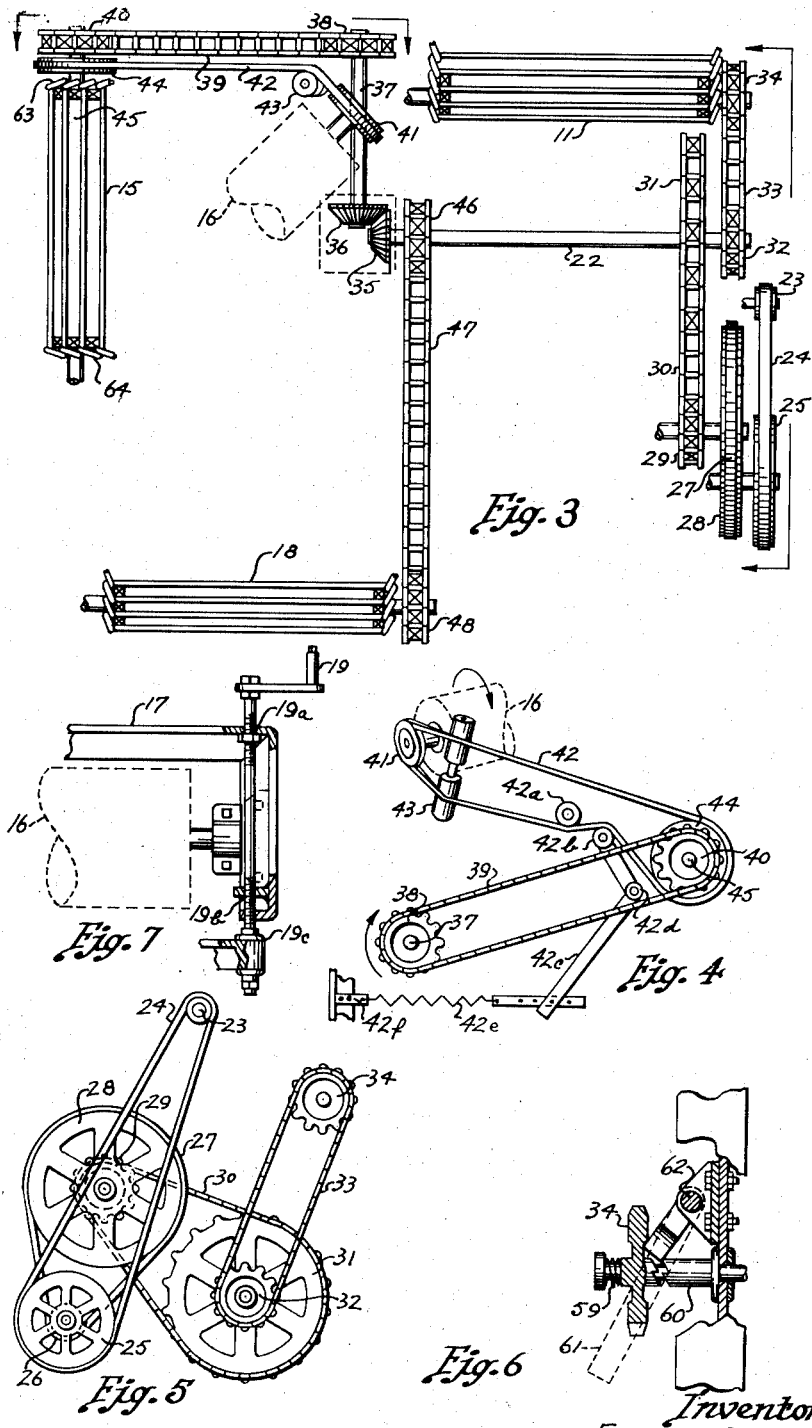
Inventors
FRANKLIN D. GRAY
EDWARD G. SNYDER
By: Fetherstonhaugh & Co.
Att'ys.

Patented Oct. 27, 1953

2,656,921

UNITED STATES PATENT OFFICE 2,656,921

DEVICE FOR SEPARATING POTATOES FROM STONES

Franklin Daniel Gray, Hillsburgh, Ontario, and Edward Groff Snyder, Preston, Ontario, Canada Application September 23, 1950, Serial No. 186,352

7 Claims. (Cl. 209—72)

This invention relates to a potato picker and is a continuation-in-part of our co-pending United States patent application, Serial No. 66,162, filed December 20, 1948. In the latter mentioned application, we disclosed a potato picker in which potatoes and stones picked up by a potato digger are deposited on an inclined portion of a conveyor. The conveyor, after elevating the potatoes and stones levels out and travels in a substantially horizontal plane. Above the horizontal portion of the conveyor we mounted a rotating brush at an incline to the direction of travel thereof, and provided means for guiding the potatoes raised by the inclined conveyor to one side of the horizontal conveyor, for presentation thereby to the forward side of the brush. The brush was designed to sweep the potatoes laterally of the conveyor but to permit the stones mixed with the potatoes to pass underneath. While a machine of the type shown in our co-pending application works satisfactorily under some conditions, we have found that for other conditions, it can be improved upon according to the following disclosure.

The present invention employs a brush of predetermined stiffness which co-acts in a similar manner with a substantially horizontal conveyor to separate stones from potatoes, but the conveyor with which the brush co-acts is, in the present invention, quite separate from the conveyor that raises the potatoes and stones from adjacent the ground. With an arrangement like this, we find it possible to run the conveyor with which the brush co-acts at a different speed relative to the conveyor that lifts the potatoes from the ground. This is desirable for many picking conditions because it permits the potatoes to be presented to the brush in a thinner line. The present invention will be fully understood after reference to the following detailed specification read in conjunction with the drawings.

In the drawings:

Figure 1 is a perspective view of a potato picker according to the present invention.

Figure 2 is a plan view of the picker with some of the detail omitted.

Figure 3 is a schematic view showing the means for driving the various moving parts of the picker.

Figure 4 is an elevational view along the lines 4—4 of Figure 3.

Figure 5 is an elevational view along the lines 5—5 of Figure 3.

Figure 6 is a detailed view showing a clutch that can be employed to disengage the inclined conveyor from its drive means.

Figure 7 is a detailed view showing a means for adjusting the height of the separating brush above the conveyor.

Referring to the drawings, the letter "A" generally indicates a potato picker according to the present invention. It is mounted on a suitably constructed chassis or wheeled frame generally indicated by the numeral 10 and to which further specific detailed reference is thought unnecessary. Any skilled mechanic could build a suitable chassis or wheeled frame for the present invention from angle iron or the like.

Within the wheeled frame 10, an endless conveyor 11 is mounted on sprockets with its conveying surface inclining rearwardly and upwardly from the forward end of the frame. The underside of the conveying surface of the conveyor 11 is supported at each of its side edges by inclined rails 13 and 14 carried by the frame 10 according to customary practice.

A second endless conveyor 15 is mounted on sprockets within the frame 10 with its conveying surface in a substantially horizontal plane, and relative to the first conveyor 11 such that the first conveyor will discharge potatoes and stones deposited thereon adjacent one side edge thereof.

A brush separating member 16 is rotatably mounted within the rack 17 that is in turn supported by the frame 10. The longitudinal axis of brush separating member 16 is at an incline to the direction of travel of the conveying surface of conveyor 15.

The angle of incline is a matter of choice depending to a large extent upon the crop conditions. We have found that an angle of incline between 35° and 50° works very well.

The manner in which rack 17 is supported in one end within the frame by crank 19 is illustrated in Figure 7. The rack itself is substantially U-shaped and threadedly engages with crank 19 as at 19a and 19b. The crank 19 is journalled in the frame as at 19c for rotation about its longitudinal axis. It will be readily understood that the end of the rack 17, and the brush which it carries, can be raised or lowered by turning crank 19. It will be appreciated that the opposite end of rack 17 can be similarly raised or lowered by crank 20.

In operation, the brush separating member 16 sweeps potatoes carried thereto by the conveyor 15 laterally of the side conveyor. The potatoes so swept from the conveyor 15 are gathered by the endless conveyor 18. The conveying surface of conveyor 18 inclines upwardly.

The conveyors 11, 15 and 18 and the brush separating member 16 are all provided with power means for operating them. In the embodiment of the invention shown, all power is derived from a small gasoline motor 21 rigidly mounted upon the frame 10.

In Figures 3, 4, and 5, we illustrate the manner in which the various parts are driven by the motor 21. Shaft 22 is the central drive shaft for all of the conveyors and for the brush. It is driven from the motor pulley 23 through the V-belt 24, pulley 25, pulley 26, V-belt 27, pulley 28, gear 29, chain 30, and gear 31.

Power to operate inclined conveyor 11 is taken from shaft 22 through gear 32, chain 33 and gear 34.

Power to operate the substantially horizontal conveyor 15 is taken from shaft 22 through the bevel gears 35 and 36, shaft 37, gear 38, chain 39 and gear 40.

The brush separating member 16 is rotated in the same direction as conveyor 15 within its mounting through pulley 41, V-belt 42, guide pulley 43 and pulley 44. Pulley 44 is rigidly mounted on the shaft 45 which carries gear 40. Belt 42 is tensioned by idler pulley 42a and pulley 42b. Pulley 42b is carried on a free end of crank 42c and crank 42c is in turn pivotally mounted on the picker frame as at 42d and spring loaded into engagement with belt 42 by spring 42e. Spring 42e is secured to the frame as at 42b.

Endless conveyor 18 is powered from shaft 22 through gear 46, chain 47 and gear 48.

The reference to the manner in which power is transmitted is brief, but sufficient to enable a skilled mechanic to construct it. Other transmissions are of course possible.

It should perhaps be mentioned that guard panels 49 and 50 shown in Figure 1 are provided to protect the clothing of operators from becoming fouled in the drive means pulleys.

The machine is provided with running boards 51 and 52 at each of its sides, and running boards 53 and 54 adjacent its back to give operators easy access to the conveyors during operation. Guides 55 and 56 are also provided to guide potatoes from the digger which precedes the picker on to the inclined conveyor 11.

In operation, the picker shown is hitched behind a digger. The digger has a shear that digs the potatoes from the ground and a conveyor that lifts them from the ground and deposits them on the inclined conveyor 11. The motor 21 is started and inclined conveyor 11 is driven to raise the potatoes and any stones that are mixed therewith and deposit them on conveyor 15 adjacent one side.

Conveyor 15 carries them along in a line and presents them to the forward end of rotating brush 16. Rotating brush 16 sweeps the potatoes laterally of the conveyor 15 on to the conveyor 18. Stones mixed with the potatoes when they are deposited on the conveyor 15 pass under the brush 16 because of their greater specific gravity and are dropped on the ground from the side of the machine.

The bristles of brush separating member 16 are designed with a flexibility that will yield to permit a heavier stone to pass thereunder when presented thereto by the conveyor 15, but that will not yield to permit a lighter potato to pass thereunder.

Conveyor 18 carries the potatoes swept thereon by the brush separating member 16 rearwardly and deposits them in bags attached to the racks 57 or 58. Bag retainer racks for gathering articles from conveyors are well-known, and detailed reference to them is thought unnecessary in this application.

It will be noted that the conveyor 15 is located relative to the conveyor 11 such that the discharge from the conveyor 11 is on one side only of the conveyor 15. This ensures that potatoes will be presented only to the forward end of the inclined brush 16 so that there will be ample opportunity for the brush to separate the stones from the potatoes as it sweeps them laterally of the conveyor.

Operators stand on the running boards 51, 52, 53 and 54 which extend along each side of the conveyors 11 and 18 to remove foreign material such as vines and larger stones. Most vines are removed as they are carried over the conveyor 11, stones not separated by the brush are removed from the conveyor 18. The potatoes are gathered in bags that are secured to the racks 57 and 58 in a known manner.

The speed at which the conveyors are operated, the inclination and rotational speed of the separating brush 16, and the height of the brush 16 above the conveyor 15 are all matters of adjustment and vary for different conditions.

Usually the digger conveyor (not shown) which deposits the potatoes and stones on to the inclined conveyor 11 travels about 1.8 times faster than ground speed in order to shake the earth from the crop. The inclined conveyor 11 operates about ⅔ ground speed in order to give the men standing on the running boards of the machine an opportunity to pick off the big stones and vines mixed with the crop. In this respect, a control for the motor 21 is desirable to vary the speed of the conveyor 11 for varying crop conditions. The motor should be capable of remote control by the operator at the rear end of the machine. In this connection, control levers 21a and 21b are provided for the motor 21.

The conveyor 15 preferably runs 25% to 30% faster than the conveyor 11. This again though, depends upon the particular crop that is being harvested. As this conveyor is sped up relative to the conveyor 11, the line of potatoes presented to the brush is thinned out whereby to give the brush 16 a better opportunity to perform its separating function. The speed must not be too great though, because it would tend to damage and bruise the potatoes.

The final conveyor 18 is operated at the same speed as the inclined conveyor 11. This is an inspection conveyor and must operate at a speed that will give the inspectors a chance to pick out any remaining foreign material.

The height at which the brush 16 is spaced apart from the conveyor over which it lies, depends on factors such as the size of the potatoes being harvested and the size of the stones to be separated therefrom.

Another adjustment we prefer to incorporate in our machine is a clutch for disengaging the conveyor 11 from its drive means. A detail is shown in Figure 6. Conveyor 11 it will be recalled, is driven by gear 34. This gear is spring urged by spring 59 into operative engagement with clutch element 60 but can be disengaged therefrom by pulling lever 61. Lever 61 is pivotally mounted as at 62 on the frame of the machine.

We would also like to add that while the conveyor 15 is what we term substantially horizontal, the forward side edge 63 thereof, can be advantageously slightly lower than the rearward side edge 64 thereof. This slight inclination tends to keep the potatoes in a thin line towards the side board on one side of the conveyor as they are presented to the forward end of the brush 16.

Embodiments of our invention other than the one disclosed will be apparent to those skilled in the art and we do not intend that the foregoing disclosure should be read in a limiting sense.

What we claim as our invention is:

1. In a device for separating stones from potatoes, a first conveyor, a second conveyor having its conveying surface in a substantially horizontal plane and mounted relative to said first conveyor to receive the discharge from the first conveyor, a brush separating member rotatably mounted about its longitudinal axis to operate above the conveying surface of said second conveyor, said brush separating member being mounted with its longitudinal axis at an incline to the direction of travel of said second mentioned conveyor, said first conveyor discharging to said second conveyor adjacent the area of said second conveyor that in operation approaches the forward end of said brush separating member, and power means for operating said first conveyor, said second conveyor, and said brush separating member, said brush separating member rotating in the same direction as said second conveyor to sweep potatoes carried thereto by said second conveyor laterally of said brush, the bristles of said brush having a flexibility that will yield to permit a stone to pass thereunder when presented thereto by said second conveyor but that will not yield to permit a potato to pass thereunder when carried thereto by said conveyor, and means for collecting potatoes swept laterally of said brush.

2. A device for separating potatoes from stones as claimed in claim 1, in which said power means for operating said conveyors and said brush is designed to operate said second conveyor at a faster rate of speed than said first conveyor.

3. A device for separating potatoes from stones as claimed in claim 1, in which said power means for operating said conveyors and said brush is designed to operate said second conveyor at a rate of speed of between 20% to 30% faster than said first conveyor.

4. A device for separating potatoes from stones as claimed in claim 1, in which said second conveyor is at right angles to said first conveyor.

5. A device for separating potatoes from stones as claimed in claim 1, in which said second conveyor is at right angles to said first conveyor, and in which said power means for operating said conveyors and said brush is designed to operate said second conveyor at a faster rate of speed than said first conveyor.

6. A device for separating potatoes from stones as claimed in claim 1, in which said second conveyor is at right angles to said first conveyor, and said brush separating member extends substantially across said second conveyor at an incline to the direction of travel thereof as aforesaid.

7. A device for separating potatoes from stones as claimed in claim 1, in which said second conveyor is at right angles to said first conveyor, and said brush separating member extends substantially across said second conveyor at an incline to the direction of travel thereof as aforesaid, and in which said power means for operating said conveyors and said brush is designed to operate said second conveyor at a faster rate of speed than said first conveyor.

FRANKLIN DANIEL GRAY.
EDWARD GROFF SNYDER.

References Cited in the file of this patent

UNITED STATES PATENTS

| Number | Name | Date |
| --- | --- | --- |
| 799,911 | Lofstam | Sept. 19, 1905 |
| 984,487 | Parks et al. | Feb. 14, 1911 |
| 992,936 | Botts et al. | May 23, 1911 |
| 1,160,792 | Van Houten | Nov. 16, 1915 |
| 1,190,950 | Piepgras et al. | July 11, 1916 |
| 1,755,660 | Morrow | Apr. 22, 1930 |
| 2,095,428 | Batie | Oct. 12, 1937 |
| 2,114,263 | Heaslet | Apr. 12, 1938 |
| 2,277,450 | Parr | Mar. 24, 1942 |

FOREIGN PATENTS

| Number | Country | Date |
| --- | --- | --- |
| 276,311 | Italy | July 19, 1930 |